US009199686B2

(12) United States Patent
Aillet et al.

(10) Patent No.: US 9,199,686 B2
(45) Date of Patent: Dec. 1, 2015

(54) STEERING AXLE FOR A VEHICLE HAVING TWO LATERALLY TILTABLE FRONT WHEELS

(71) Applicant: PEUGEOT MOTOCYCLES SA, Mandeure (FR)

(72) Inventors: Jean-Laurent Aillet, Blamont (FR); Marco Doveri, Ponderata (IT); Gwendal Moisan, Belfort (FR); Stephane Naisse, Presentevillers (FR)

(73) Assignee: Peugeot Motorcycles SA, Mandeure (FR)

( * ) Notice: Subject to any disclaimer, the term of this patent is extended or adjusted under 35 U.S.C. 154(b) by 0 days.

(21) Appl. No.: 14/413,028

(22) PCT Filed: Jul. 4, 2013

(86) PCT No.: PCT/FR2013/051598
§ 371 (c)(1),
(2) Date: Jan. 6, 2015

(87) PCT Pub. No.: WO2014/009637
PCT Pub. Date: Jan. 16, 2014

(65) Prior Publication Data
US 2015/0183484 A1    Jul. 2, 2015

(30) Foreign Application Priority Data
Jul. 11, 2012    (FR) ...................................... 12 56668

(51) Int. Cl.
*B62K 5/08*    (2006.01)
*B62K 5/10*    (2013.01)
(Continued)

(52) U.S. Cl.
CPC . *B62K 5/10* (2013.01); *B60G 13/16* (2013.01); *B60G 13/18* (2013.01); *B60G 21/007* (2013.01);
(Continued)

(58) Field of Classification Search
CPC .......... B62K 5/10; B62K 5/027; B60G 13/18; B60G 13/16; B60G 21/00
See application file for complete search history.

(56) References Cited

U.S. PATENT DOCUMENTS 1,824,566 A * 9/1931 Paton et al. ...................... 267/80
5,004,061 A * 4/1991 Andruet ...................... 180/65.51
(Continued)

FOREIGN PATENT DOCUMENTS

EP    1813450 A1    8/2007
FR    839855 A    4/1939
(Continued)

OTHER PUBLICATIONS

International Search Report of corresponding application PCT/FR2013/051598 mailed Oct. 14, 2013.

*Primary Examiner* — Brodie Follman
*Assistant Examiner* — Hilary L Johns
(74) *Attorney, Agent, or Firm* — Polster Lieder

(57) ABSTRACT

The invention concerns an undercarriage (35) for a vehicle comprising a chassis, two front steering wheels (36D, 36G) and at least one rear drive wheel. The undercarriage comprises, combined with each wheel, a suspension system (39) suspending the wheel from said chassis, said system (39) comprising an upper suspension arm (40), a lower suspension arm (41) and a lateral arm (42), said arms being linked together by articulated means (43, 44, 45, 46) such that a lateral tilting of the undercarriage results in an equivalent tilting of the two front wheels, which remain parallel to each other. According to a feature of the invention, the undercarriage comprises a damper (50), integral with each front wheel, to at least partially cancel the oscillation frequencies of said front wheel.

10 Claims, 2 Drawing Sheets

(51) Int. Cl.
*B60G 13/16* (2006.01)
*B60G 13/18* (2006.01)
*B62K 5/027* (2013.01)
*B62K 5/05* (2013.01)
*B62K 5/01* (2013.01)
*B60G 21/00* (2006.01)
*B62K 5/00* (2013.01)

(52) U.S. Cl.
CPC . *B62K 5/01* (2013.01); *B62K 5/027* (2013.01); *B62K 5/05* (2013.01); *B62K 5/08* (2013.01); *B60G 21/00* (2013.01); *B60G 2202/25* (2013.01); *B60G 2300/122* (2013.01); *B60G 2300/45* (2013.01); *B62K 2005/001* (2013.01)

(56) References Cited

U.S. PATENT DOCUMENTS 5,765,846 A * 6/1998 Braun ................... 280/124.103
2007/0182120 A1* 8/2007 Tonoli et al. ........... 280/124.142
2010/0263167 A1* 10/2010 Fox ................................ 16/400

FOREIGN PATENT DOCUMENTS

| FR | 2921628 A1 | 4/2009 |
| WO | 9202382 A1 | 2/1992 |
| WO | 9941136 A1 | 8/1999 |

\* cited by examiner

STEERING AXLE FOR A VEHICLE HAVING TWO LATERALLY TILTABLE FRONT WHEELS

CROSS-REFERENCE TO RELATED APPLICATIONS

The present application is the US National stage under 35 U.S.C. §371 of International Application No. PCT/FR2013/051598, filed Jul. 4, 2013, and which claims priority of French App. No. 1256668 filed on Jul. 11, 2012, the content of which (text, drawings and claims) is included here by reference.

BACKGROUND

The present invention relates to the steering axle of a vehicle, such as a scooter, with two tilting front wheels.

In order to increase the steering comfort and road handling of scooters, the front axle of certain models was improved by incorporating two sideways tilting steering wheels. This type of vehicle is described for instance in WO 9721583 or in the patent application EP 1180476 A1.

This patent application relates to a vehicle 10 shown schematically in FIG. 1. The vehicle 10 comprises a chassis 11 supporting an engine 12, a rear wheel 13 connected to the engine 12, and two front wheels 14 and 15 which are part of a suspension system 16 (shown schematically), a handlebar 17 and a steering column 18 with a tubular sleeve 19 secured to the chassis 11. In association with the right and left front wheels 14, 15, the suspension system 16 includes a deformable quadrilateral composed of an upper suspension arm 20D (D for right) or 20G (G for left), respectively, a lateral arm 21, respectively, 21D or 21G, a lower arm 22D or 22G, respectively, and for the two right and left quadrilaterals, the lower extremity 19i of the sleeve 19. The tubular sleeve 19 comprises two supports, an upper support 23 and a lower support 24 welded to the sleeve. The upper arms 20D and 20G are connected on one side by pivots to the upper support 23 and, on the other side, by ball joints 25 and 26, respectively, to the lateral arms 21D and 21G. Similarly the lower arms 22D and 22G are connected on one side by pivots 27 to the lower support 24 and, on the other side, by ball joints 28 and 29, respectively, to the lateral arms. This deformable parallelepiped structure with pivots and ball joints allows for the sideways tilting of the vehicle, while maintaining the front wheels parallel (or at least approximately parallel) to each other. The two upper arms 20D and 20G are interconnected by means of an elastic suspension, comprised of a fluid shock absorber 30 and a spring 31, which allows for the vertical movement of the front part of the vehicle.

Although adequate, the above described architecture is not entirely satisfactory, especially for what concerns the road handling of the scooter.

BRIEF SUMMARY

The goal of the present invention is to improve the stability and road handling of a vehicle of the above described type, even on roads with poor surface and/or at relatively high speed (for instance greater than 80 km/h).

More specifically, the invention relates to a steering axle for a vehicle type having a chassis, two front steering wheels and at least one rear drive wheel. The steering axle comprises, associated with each wheel, a suspension system for the wheel to the chassis. The suspension system comprises an upper suspension arm, a lower suspension arm and a lateral arm, the arms being interconnected by articulated means so that a sideways tilting of the steering axle leads to an equivalent tilting of the two front wheels while they remain parallel to each other. The term "parallel wheels" is intended to include approximately parallel wheels, as long as the parallelism deviation is not noticeable in the steering. According to the invention, integral with each front wheel, the steering axle comprises means for at least partially suppressing the oscillation frequency of the front wheel.

The suppression means can be adjusted to eliminate, at least partially, the oscillation frequencies within a range of 10 to 20 Hz, preferably centered around 15 Hz.

In a preferred embodiment, the suppression means includes for each of the front steering wheels a dashpot mounted in a substantially vertical position on one of the arms, which can be the upper arm or the lower arm or the lateral arm.

According to another feature of the invention, the caster angle of the steering axle is between 8° and 18°, preferably between 12° and 14° and advantageously substantially equal to 13°.

The invention also relates to a scooter type having two front wheels and at least one rear wheel and a steering axle as defined above.

BRIEF DESCRIPTION OF THE FIGURES

Other features and advantages of the invention will become apparent from the following description of an embodiment of the invention, given as non-limiting example, with reference to the attached drawings, in which.

DESCRIPTION

According to a characteristic of the invention, suppression means are added to each of the front steering wheels to at least partially suppress the oscillation frequencies of the steering wheel.

Figure 1:
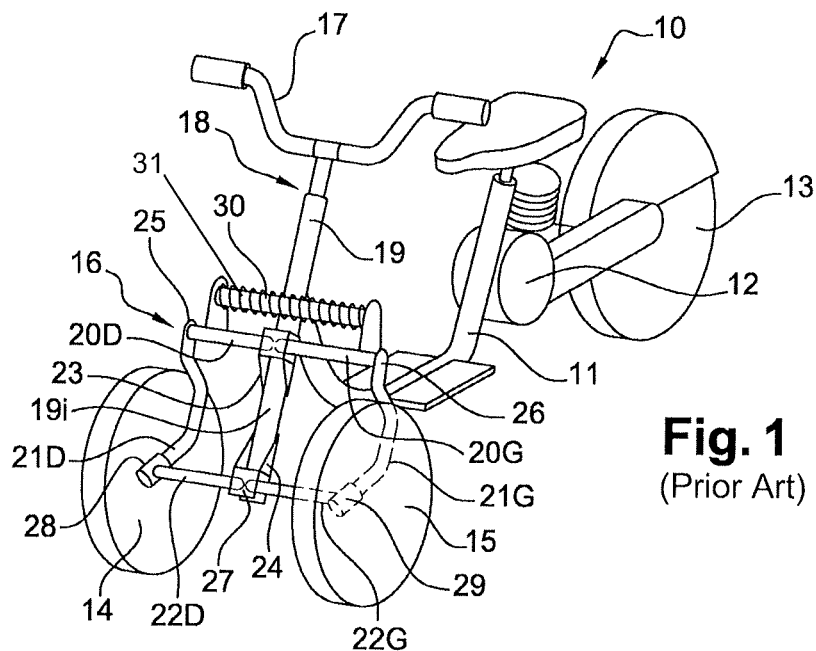
FIG. 1 (prior art) shows the known architecture of a vehicle having two sideways tilting front wheels.
Figure 2:
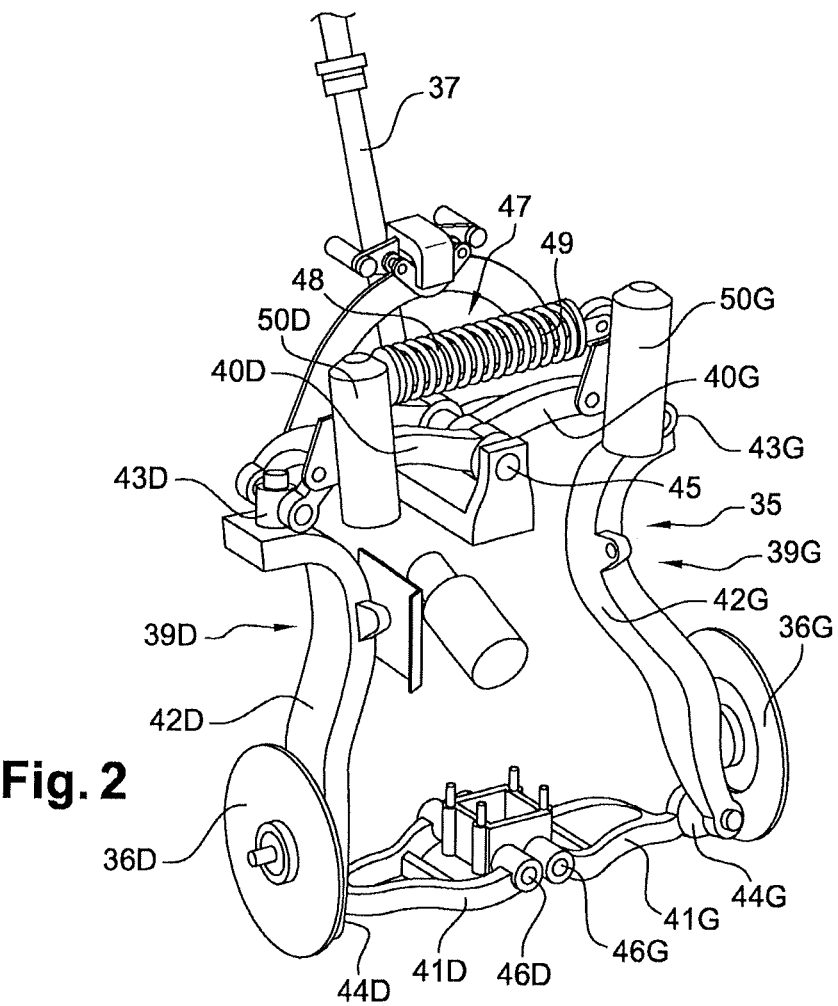
FIG. 2 shows an embodiment of a steering axle according to the invention.

FIG. 2 shows the steering axle 35 of a vehicle with two front steering wheels, namely a right wheel 36D and a left wheel 36G (in the following, the letter D designates the right side of the chassis and the letter G the left) and a steering column 37 secured to the vehicle chassis. This vehicle is of the type shown schematically in FIG. 1. The steering axle 35 includes a suspension system for the front wheels. This system breaks down into a part 39D for the right wheel and a part 39G for the left wheel. Each of the parts 39D and 39G comprises an upper arm 40D or 40G, a lower arm 41D or 41G and a lateral arm 42D or 42G. The hubs 44D and 44G respectively of the right wheel 36D and the left wheel 36G are mounted to the lateral arms 42D and 42G, respectively. The arms of the parts are interconnected by articulated means so that a sideways tilting of the lateral arms 42 and upper arms 40 causes an equivalent tilting of wheels 36 which remain parallel to each other.

The articulated means includes ball joints 43D and 43G connecting the upper arms 40D or 40G with the lateral arms 42D and 42G, respectively, and ball joints 44D and 44G connecting the lower arms 41D or 41G, respectively, with the lateral arms 42D and 42G, respectively. The upper arms are connected by a pivot shaft 45 and the lower arms are connected by the shafts of pivots 46D and 46G.

An elastic suspension 47, composed of an hydraulic shock absorber 48 and a spring 49 connects the two upper arms 40D and 40G. This suspension 47 allows for the vertical movement of the steering axle 35 of the vehicle.

According to one characteristic of the invention, the steering axle comprises means to dampen or at least partially eliminate the vibrations of the steering axle due to the vibrations of the wheels. An alternating vibration of the two wheels can indeed occur in case of a vertical load on one of the two wheels, which continues at the natural frequency of the front axle (called "alternate chatter"). This problem may be due to the elastic suspension 47 which transmits vibrations from one wheel to the other and the fact that the projection on the ground of the rotational axis passing through the two rotational ball joints of each steering wheel (which defines the steering axis of said wheel) is not coinciding with the central plane of the wheel, creating in this way what experts call a "positive steering roll radius." The dimensions of the wheel hub and of the brake system are the primary cause of this non-coincidence.

In one embodiment of the invention, said means to dampen or at least partially eliminate the vibrations of the steering axle include a dashpot 50D associated with the right wheel 36D and a dashpot 50G associated with the left wheel 36G, whereby both dashpots have the same characteristics. A dashpot is a device consisting of a cylinder filled with oil, in which a mass (usually cast iron) can move freely between two springs. Dashpots 50D and 50G are mounted in a vertical position, each for example by means of one or two bolts, to the upper arms 40D and 40G respectively. The dashpots can also be mounted on the lateral arms or the lower arms. The mass of the dashpot is adjusted as a function of the non-suspended mass of the front train (consisting essentially of wheel, tire, brake and arm). The oscillation frequency of the mass of the dashpots is adjusted to a value corresponding with the oscillation frequency of the wheel due to irregularities and high/low spots in the road surface.

The oscillation frequency of the dashpots is adjusted within a range of 10 Hz to 20 Hz, preferably 14 to 16 Hz and more specifically centered around 15 Hz. This frequency can be achieved by adjusting parameters such as, for instance, the geometry of the cylinder, the weight of the moving mass in the cylinder and/or the fluid flow characteristics. This adjustment is for instance described in the reference work "Automobile Dynamics" by Maurice Julien, Volume 1 System Dynamics, for instance, page 173.

Figure 3:
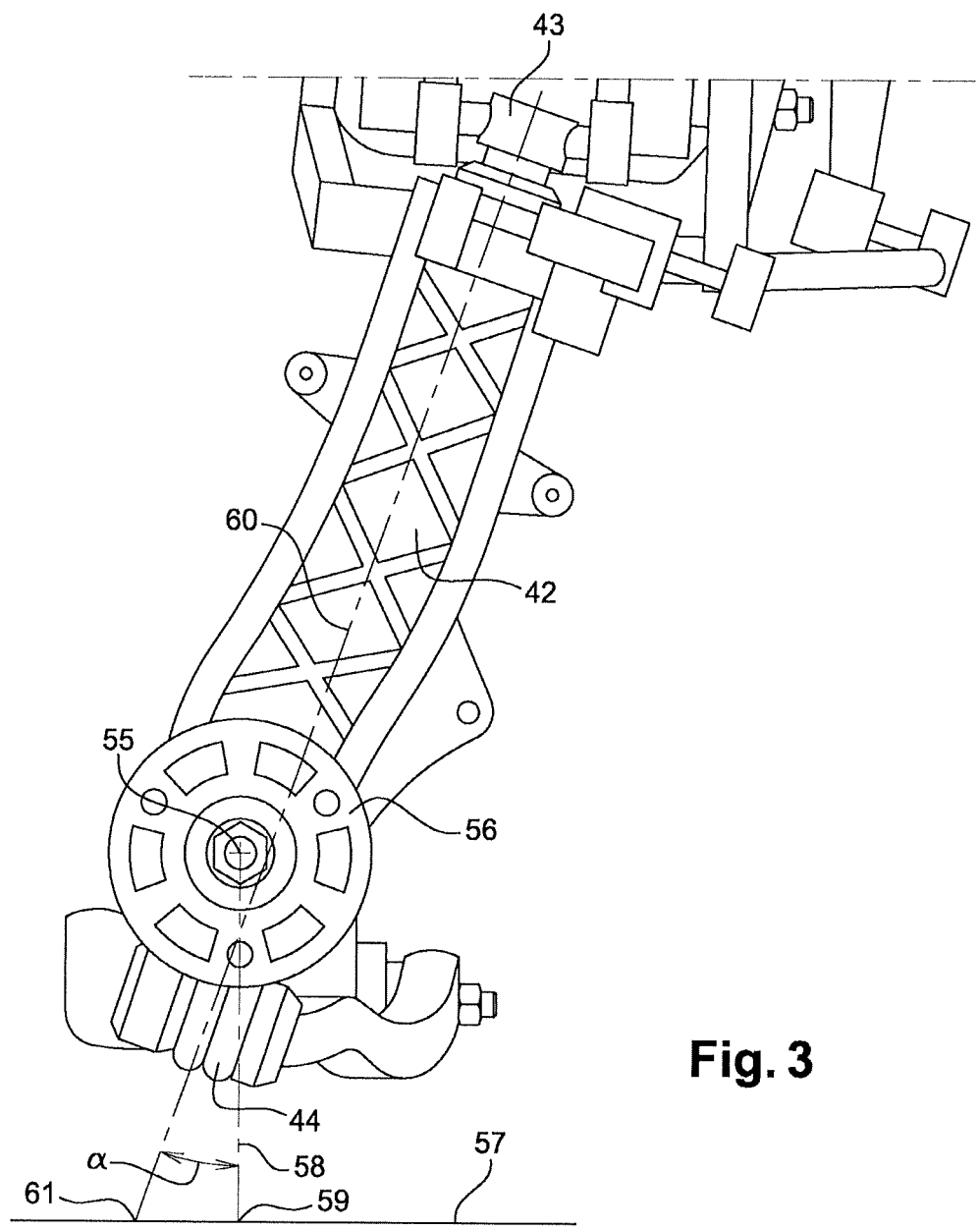
FIG. 3 shows the caster angle.

According to another characteristic of the invention, the caster angle is in a range between 8° and 18°, advantageously between 12° and 14° and preferably equal to or close to 13°. The caster angle is illustrated in FIG. 3 which is a side view of a portion of the steering axle shown in FIG. 2. FIG. 3 shows a lateral arm 42, the ball joints 43 and 44 for rotation of respectively the upper arm 40 and the lower arm 41, the rotational axis of steering wheel 5, and the wheel hub 56. The ground is represented by the horizontal line 57. The lateral arm 42 is shown inclined relative to the ground, as it is mounted on the vehicle. The vertical projection 58 (dashed line in the figure) of the wheel axis 55 on the ground takes place at a point 59 and the axis 60 (dashed line) joining the rotational axes of the ball joints 43 and 44 intersects the line on the ground at a point 61. The angle α between the vertical line 58 and axis 60 is the caster angle. The relatively large caster angle values advocated by the present invention significantly improve the road handling performance at high speed of the vehicle.

A vehicle equipped with dashpots and having a relatively large caster angle, between 8° and 18°, can reach high speeds (approaching 140 or 150 km/h) with good road handling and comfort of use.

The present invention relates also to a scooter provided with two steering wheels at the front of the scooter, at least one drive wheel located at the rear of the scooter and a steering axle as defined above and shown in FIGS. 2 and 3.

The invention claimed is:

1. A steering axle for a vehicle of the type comprising a chassis, two front steering wheels and at least one rear drive wheel, said steering axle comprising a suspension system associated with each of said front steering wheels to said chassis, each said suspension system comprising an upper suspension arm, a lower suspension arm and a lateral arm, said arms being interconnected by joints adapted to enable a sideways tilting of the chassis which results in an equivalent tilting of the two front wheels, which remain substantially parallel to each other; said steering axle further comprising an elastic suspension connecting the upper arm of each said suspension system and a suppression means secured to each front wheel to at least partially suppress oscillation frequencies of said front wheels.

2. The steering axle according to claim 1 wherein said suppression means is adjusted to at least partially suppress the oscillation frequencies within a range of 10 to 20 Hz.

3. The steering axle according to claim 1 wherein said oscillation frequencies are centered around 15 Hz.

4. The steering axle according to claim 1 wherein said suppression means comprises, for each of said front steering wheels, a dashpot mounted in a substantially vertical position on one of said arms.

5. The steering axle according to claim 4, wherein said dashpot is mounted to said upper suspension arm.

6. The steering axle according to claim 1 wherein said steering axle comprises a caster angle (α) of between 8° and 18°.

7. The steering axle according to claim 6, wherein said caster angle (α) is between 12° and 14°.

8. The steering axle according to claim 7, wherein said caster angle (α) is substantially equal to 13°.

9. A scooter comprising two front wheels and at least one rear wheel, wherein said scooter comprises a steering axle according to claim 1.

10. The steering axle according to claim 1 wherein said elastic suspension comprises a shock absorber and a spring.

* * * * *